(12) United States Patent
Take et al.

(10) Patent No.: US 11,241,873 B2
(45) Date of Patent: Feb. 8, 2022

(54) SOUND ABSORPTION/INSULATION HONEYCOMB PANEL

(71) Applicant: SHIZUKA CO., LTD., Atsugi (JP)

(72) Inventors: Koichi Take, Yokohama (JP);
Tomohisa Nakamura, Atsugi (JP);
Daisuke Iwasaki, Atsugi (JP); Takuma Nemoto, Atsugi (JP)

(73) Assignee: SHIZUKA CO., LTD., Atsugi (JP)

( * ) Notice: Subject to any disclaimer, the term of this patent is extended or adjusted under 35 U.S.C. 154(b) by 258 days.

(21) Appl. No.: 16/614,340

(22) PCT Filed: Jun. 26, 2019

(86) PCT No.: PCT/JP2019/025329
§ 371 (c)(1),
(2) Date: Nov. 15, 2019

(87) PCT Pub. No.: WO2020/095475
PCT Pub. Date: May 14, 2020

(65) Prior Publication Data
US 2021/0331457 A1     Oct. 28, 2021

(30) Foreign Application Priority Data

Nov. 8, 2018 (JP) .............................. JP2018-210130
Apr. 2, 2019 (JP) .............................. JP2019-070929

(51) Int. Cl.
*B32B 3/00* (2006.01)
*B32B 5/00* (2006.01)
(Continued)

(52) U.S. Cl.
CPC ............ *B32B 37/1292* (2013.01); *B32B 3/12* (2013.01); *B32B 5/022* (2013.01); *B32B 5/18* (2013.01);
(Continued)

(58) Field of Classification Search
CPC .... B32B 3/00; B32B 3/10; B32B 3/12; B32B 5/00; B32B 5/02; B32B 5/022;
(Continued)

(56) References Cited

FOREIGN PATENT DOCUMENTS

EP    1829674 A1    9/2007
GB    2277709 A     11/1994
(Continued)

OTHER PUBLICATIONS

Extended European Search Report for corresponding European Patent Application No. 19797975.0 dated Feb. 24, 2021 (8 sheets).

*Primary Examiner* — Jacob T Minskey
*Assistant Examiner* — Matthew Hoover
(74) *Attorney, Agent, or Firm* — Kratz, Quintos & Hanson, LLP

(57) ABSTRACT

For forming a sound absorption/insulation honeycomb panel by stacking an air-permeable material, a honeycomb material filled with a sound absorption material and a reflector, and adhesively joining these materials, it is hard to join the honeycomb material and the air-permeable material adhesively due to a thin wall surface of the honeycomb material and a resultant line to surface adhesive joint therebetween, causing a problem of low adhesive strength. By using a water absorption honeycomb material, an adhesive joint is formed with an adhesive joint area increased by dipping an end of a wall surface of a cell forming the water absorption honeycomb material into a water-soluble adhesive, making the end flexible over a fixed period of time, and then pressing the end strongly against an air-permeable material as a counterpart of the adhesive joint to deform a tip into an inverted T-shape.

5 Claims, 12 Drawing Sheets

(51) Int. Cl.
    *B32B 7/00*         (2019.01)
    *B32B 37/00*       (2006.01)
    *E04B 1/00*        (2006.01)
    *E04C 2/00*        (2006.01)
    *G10K 11/00*       (2006.01)
    *B32B 37/12*       (2006.01)
    *B32B 5/18*        (2006.01)
    *B32B 7/14*        (2006.01)
    *B32B 5/02*        (2006.01)
    *B32B 5/24*        (2006.01)
    *B32B 37/14*       (2006.01)
    *E04B 1/86*        (2006.01)
    *E04C 2/36*        (2006.01)
    *G10K 11/168*      (2006.01)
    *B32B 3/12*        (2006.01)
    *E04B 1/74*        (2006.01)

(52) U.S. Cl.
    CPC ............ *B32B 5/245* (2013.01); *B32B 7/14* (2013.01); *B32B 37/146* (2013.01); *E04B 1/86* (2013.01); *E04C 2/365* (2013.01); *G10K 11/168* (2013.01); *B32B 2262/103* (2013.01); *B32B 2266/0278* (2013.01); *B32B 2266/0285* (2013.01); *B32B 2307/102* (2013.01); *B32B 2307/724* (2013.01); *B32B 2307/726* (2013.01); *B32B 2607/00* (2013.01); *E04B 2001/748* (2013.01)

(58) Field of Classification Search
    CPC .... B32B 5/10; B32B 5/18; B32B 5/20; B32B 5/24; B32B 5/245; B32B 7/00; B32B 7/10; B32B 7/14; B32B 37/00; B32B 37/10; B32B 37/12; B32B 37/129; B32B 37/1292; B32B 37/14; B32B 37/146; E04B 1/00; E04B 1/80; E04B 1/86; E04C 2/00; E04C 2/30; E04C 2/36; E04C 2/365; G10K 11/00; G10K 11/10; G10K 11/16; G10K 11/168
    See application file for complete search history.

(56) References Cited

FOREIGN PATENT DOCUMENTS

| | | |
|---|---|---|
| JP | S52-089481 U | 7/1977 |
| JP | 2007-062181 A | 3/2007 |
| JP | 5127975 B1 | 1/2013 |
| JP | 2015-199320 A | 11/2015 |
| JP | 2018-103607 A | 7/2018 |

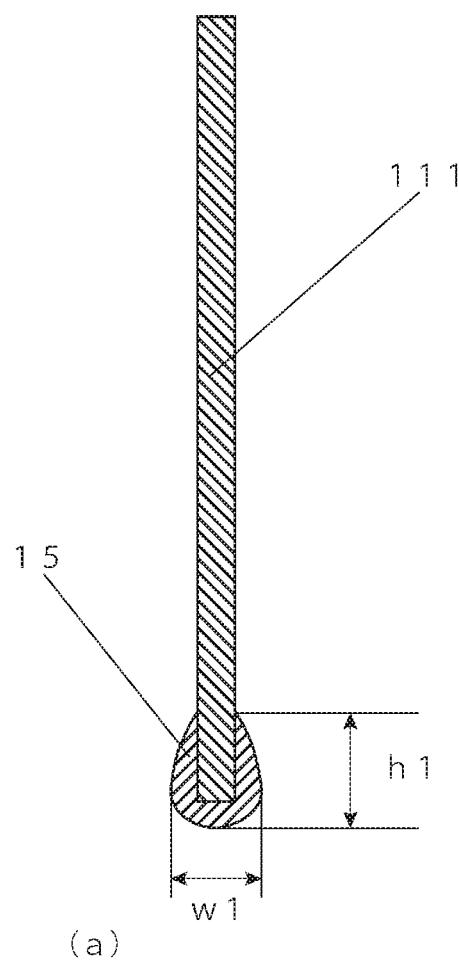
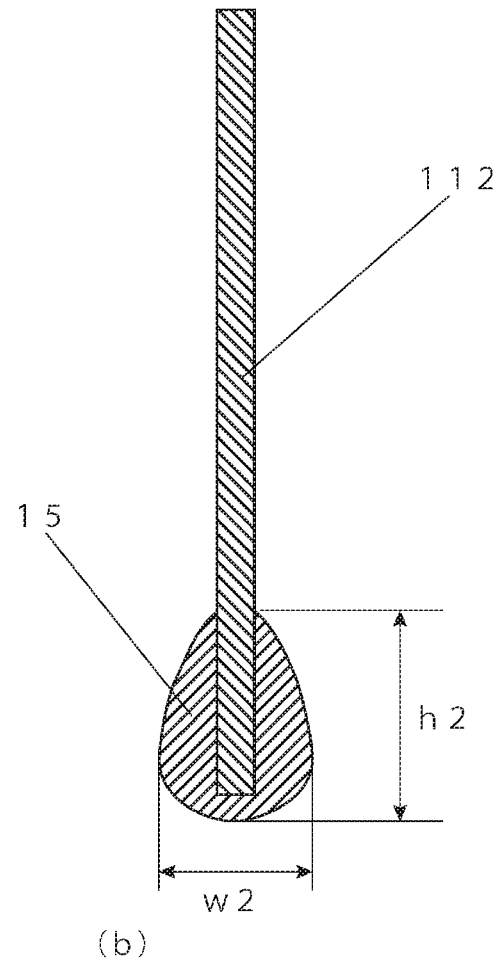

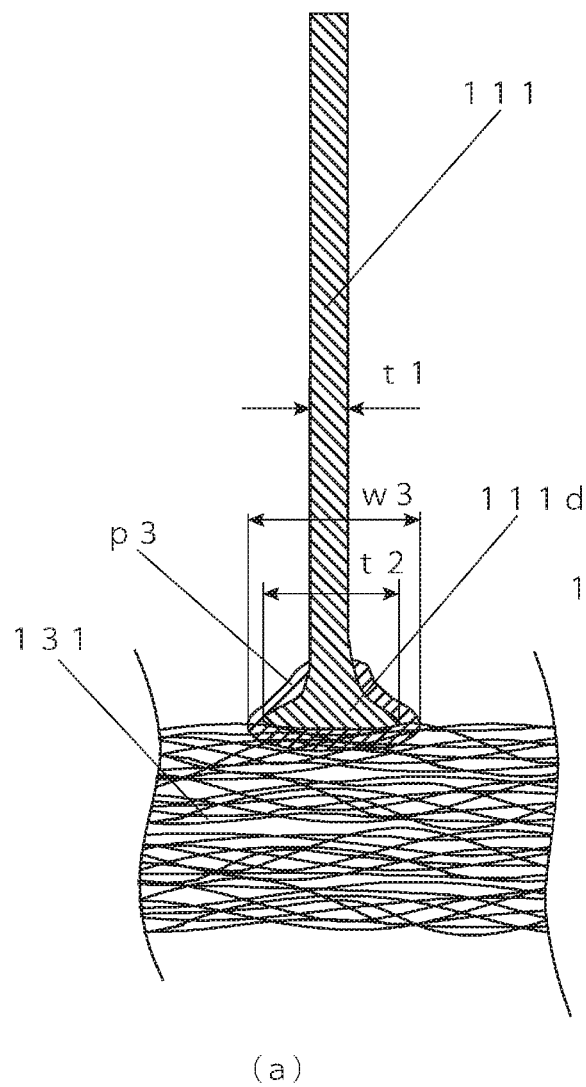
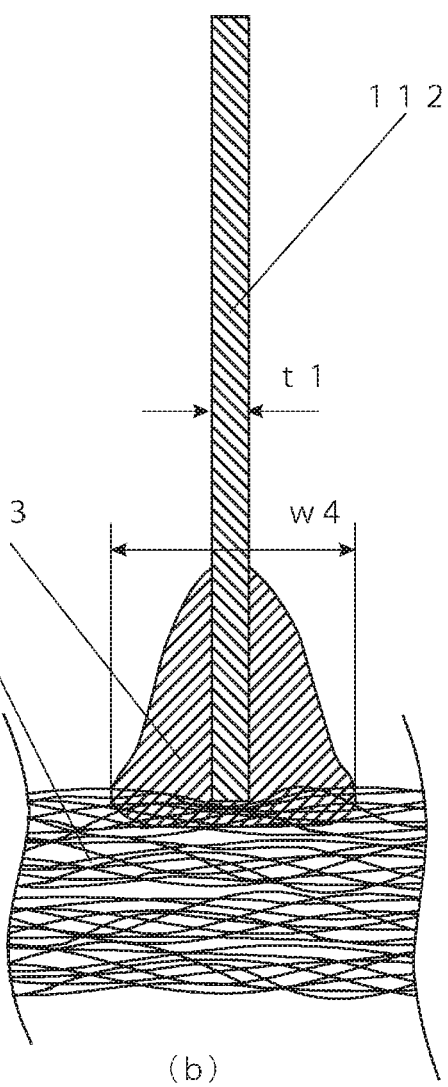
FIG. 2A (a)
FIG. 2B (b)

(a)

(b)

(a)

(b)

(a)

(b)

(a)

(b)

(a)

(b)

(a)

(b)

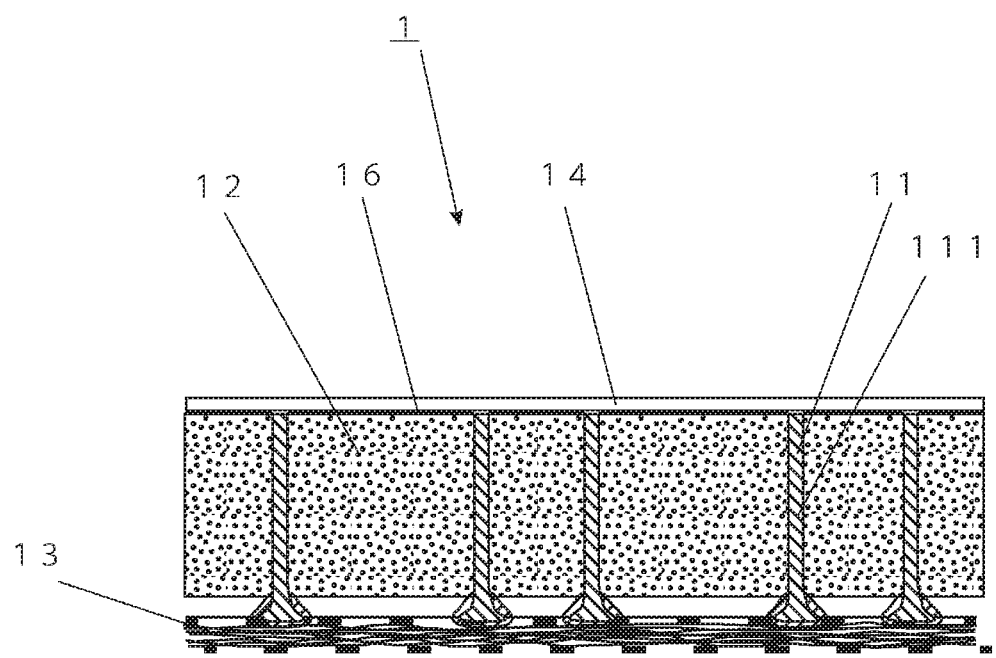

SOUND ABSORPTION/INSULATION HONEYCOMB PANEL

TECHNICAL FIELD

The present invention relates to a panel for sound absorption/insulation used as a sound shielding measure against noise sources such as industrial machines, houses, household equipment, and mobile sources.

BACKGROUND ART

Complaints against noise are on the increase resulting from change in urban environment caused by a concentration of population, development of transportation networks, electrification of houses, etc. A survey conducted in 2016 by the Ministry of Public Management, Home Affairs, Posts and Telecommunications shows that noise pollution has surpassed air pollution to become the primary cause for complaints. In particular, complaints against low-frequency sound are on the increase every year. Hence, development of light-weight, thin, and easy to handle sound shielding panels has been desired strongly.

A sound absorption panel as a conventional technique has a stacked structure formed by adhesively joining multiple materials suitable for sound absorption or insulation to a honeycomb material as a core filled with a sound absorption foam material (patent literature 1). This is a satisfactory panel in terms of sound absorption and insulation properties. According to the structure of this panel, however, a wall surface forming a cell of the honeycomb material is butt-joined at a right angle to a surface of the stacked structure for adhesively joining the honeycomb material and an air-permeable surface material (hereinafter abbreviated as an air-permeable material). This has caused difficulty in ensuring an adhesive joint area due to a small thickness of the wall surface.

For adhesively joining the honeycomb material and the air-permeable material, achieving a method of obtaining maximum adhesive strength with a minimum quantity of an adhesive has been a problem to be solved. According to the foregoing conventional technique, strength is ensured by simply increasing the quantity of the adhesive to be applied to a tip and a wall surface of the honeycomb material for butt-joining the honeycomb material and adhesively joining the honeycomb material to an air-permeable surface (sound absorption surface).

However, the adhesive applied to the wall surface of the honeycomb material flows over the wall surface of the honeycomb material when the honeycomb material is butt-joined to the air-permeable material forming the sound absorption surface to enter a surface of the air-permeable material, resulting in a loss of a hole or a gap between fibers of the air-permeable material. This has caused problems such as reduction in a sound absorption area due to the loss of the gap, reduction in a commercial value due to dirt on the air-permeable surface caused by the incoming adhesive, etc.

A large quantity of an adhesive causes cost increase. Additionally, many adhesives generally used belong to Class 4 dangerous goods. This causes a problem that increased quantities of use prevents flame resistance of products.

According to a different suggested technique, by using the flexibility of each of sponge-based materials forming a sound absorption surface and a sound insulation surface, a honeycomb material is forced into the sponge-based materials to increase an area of an adhesive joint with the honeycomb material. In this way, the adhesive force of an adhesive applied to the honeycomb material is increased (patent literature 2).

According to this technique, materials for the sound absorption surface and the sound insulation surface are limited to the sponge-based material, causing a problem that sufficient sound absorption/insulation properties are not always achieved.

According to a different suggested method, by using the water absorbing properties of a felt-like fiber material forming a sound absorption surface, moisture in a water-soluble adhesive is caused to permeate into fiber to increase an area of the permeation of the adhesive. In this way, a composite structure integrated with a wall surface of a honeycomb material is formed to increase adhesive force (patent literature 3).

According to this method, a material for the sound absorption surface is also limited to the felt-like fiber material, also causing a problem that sufficient sound absorption/insulation properties are not always achieved.

A different suggestion is responsive to an issue that, for producing each type of panel by affixing a surface material to a honeycomb material as a core, a contact surface for affixation between a constituting raw material of the honeycomb material and the surface material is defined only by the thickness of the constituting raw material of the honeycomb material, so that a comparatively large quantity of an adhesive is required to obtain strength after formation of the adhesive joint. According to this suggestion, for achieving a large contact area, upper and lower contact surfaces of the constituting raw material are pressed with a roller to widen the area of each constituting raw material (patent literature 4).

This has caused a problem that equipment or effort is required for pressing the contact surface of the constituting raw material with the roller. This has caused an additional problem that, even a skilled operator may still fail to press the contact surface of the entire constituting raw material uniformly to make this work troublesome.

According to a different suggested structure, for producing a sandwich panel made of a honeycomb core material formed by tightly aligning multiple hollow polygonal columns in rows and a pair of skin plates adhesively joined to the opposite surfaces of the honeycomb core material, to prevent reduction in adhesive strength to be caused by a small area of contact between the honeycomb core material and each of the skin plates and a resultant small area of an adhesive joint between the honeycomb core material and each of the skin plates (line to surface adhesive joint), adhesive joint surfaces facing the inner surfaces of fiber reinforced resin plates (skin plates) are connected to ends of the polygonal column in the lengthwise direction thereof forming the honeycomb core material (patent literature 5).

According to one example suggested for producing the honeycomb core material, the adhesive joint surfaces are formed by processing a raw material by pressing or bending, for example. By doing so, resultant upper and lower adhesive joint surfaces facing the inner surfaces of the skin plates are mutually continuous with each other. According to a different suggested example, each of upper and lower ends of each side forming a hexagon are formed by cutout process or bending process into a T shape or an L shape in a cross section. By doing so, a resultant adhesive joint surface facing the inner surface of the skin plate has a shape straddling a peripheral edge of an opening of the hexagon at an end of the honeycomb in the lengthwise direction thereof (marginal shape). In this way, an adhesive joint surface facing the inner surface of the skin plate is given a large area. As a result, sufficient adhesive strength is expected to be achieved.

However, this manufacturing method is to lose advantage of being light weight and easy to manufacture achieved by a honeycomb core material produced by a conventional method of preparing a material by applying an adhesive in linear patterns shifted in positions to a large number of flat plates stacked on each other, cutting the material into an intended width, and expanding the material. This means that, for manufacturing sandwich panels of the same area, a material for a honeycomb core material is increased, steps become complicated, and thus manufacturing cost is unintentionally increased.

CITATION LIST

Patent Literatures

Patent Literature 1: Publication of Japanese Patent No. 3806744
Patent Literature 2: Publication of Japanese Patent No. 5127975
Patent Literature 3: Publication of Japanese Patent No. 6292339
Patent Literature 4: Japanese Utility-model Application No. Sho 50-178337 (Japanese Utility-model Application Publication No. 52-089481)
Patent Literature 5: Publication of Japanese Patent No. 6331619

SUMMARY OF INVENTION

Technical Problem

A sheet-like member made of inorganic fiber such as glass fiber, rock wool, or ceramic fiber used as a sound absorption material of a sound absorption/insulation panel, or a metallic thin line used as an air-permeable material, is flexible as the member itself. Hence, even if a thickness or density is selected, problems also arise in terms of lack of flatness and self-standing performance.

A honeycomb material is suitably used for forming a panel with ensured strength and self-standing performance by being combined with and stacked on a sheet-like air-permeable material made of inorganic fiber. However, this causes a fundamental problem as follows. When the honeycomb material is stacked on the sheet-like air-permeable material, a tip of a wall surface material of a cell forming the honeycomb material is to be butt-joined to the sheet-like air-permeable material. The thickness of the wall surface material of the cell forming the honeycomb material is defined only by the thickness of a constituting raw material to result in an extremely small adhesive joint area, causing difficulty in ensuring adhesive strength.

The present invention is intended to solve the problems occurring when a sound absorption/insulation panel is manufactured by adhesively joining a honeycomb material to a sheet-like air-permeable material made of the foregoing metallic, or inorganic or organic material and having porosity or many gaps between fibers, etc.

More specifically, a problem to be solved is to increase the strength of an adhesive joint between a tip of a wall surface material of a cell forming a honeycomb material and a sheet-like member made of metallic fiber forming an air-permeable material when a panel is produced by using the honeycomb material and forming a sound absorption layer by filling space in the cell of the honeycomb material with a foam material, and adhesively joining the sound absorption layer and the air-permeable material forming an incident surface of sound (sound absorption surface).

The present invention is also intended to solve secondary problems such as reduction in a sound absorption area due to a loss of a hole or a gap between fibers of an air-permeable material caused by flow of an adhesive being used, reduction in a commercial value due to dirt on an air-permeable surface caused by the adhesive having flowed, etc.

Solution to Problem

A sound absorption/insulation honeycomb panel is formed by stacking three materials including a sound absorption layer made of a water absorption honeycomb material and a foam material filling a cell of the water absorption honeycomb material, an air-permeable material and a reflector, and joining these materials adhesively. In this sound absorption/insulation honeycomb panel, a tip of a wall surface material of the cell forming the water absorption honeycomb material is dipped in a water-soluble adhesive for a fixed period of time to become flexible. Then, the water absorption honeycomb material is pressed strongly against the air-permeable material as a counterpart of an adhesive joint to deform a cross section at the tip of the wall surface material of the cell into an inverted T-shape, thereby forming an adhesive joint with an increased adhesive joint area.

This step will be described in a little more detail. When a certain period of time has passed since dipping into the water-soluble adhesive, the water absorption honeycomb material absorbs moisture in the this adhesive to make its tissue flexible. This produces a state allowing the adhesive to permeate into the honeycomb material easily. Thus, placing the honeycomb material in a dipped state for a fixed period of time makes the dipped tip of the wall surface of the cell flexible and causes permeation of the adhesive. Thus, by pressing the tip of the wall surface of the cell forming the honeycomb material strongly against the air-permeable material after the dipping for the fixed period of time, the tip is deformed into an inverted T-shape. By maintaining this state, the adhesive is dried and cured, thereby forming an adhesive joint. When the adhesive is cured, a composite structure is formed between the adhesive and the honeycomb material to increase strength. Even if the honeycomb material is dipped again into water, the cured part of the adhesive joint does not become flexible again.

FIG. 1(a) conceptually shows the quantity of an adhesive 15 to be applied to a tip of a wall surface material 111 of a water absorption honeycomb material in terms of an adhesive application height h1 and an adhesive width w1. Characteristically, this quantity is considerably smaller than a quantity determined by the conventional method conceptually shown in FIG. 1(b) in terms of an adhesive application height h2 and an adhesive width w2, while achieving intended adhesive strength.

As shown in FIG. 2(a), according to the present invention, the wall surface material 111 of the water absorption honeycomb material is butt-joined to a surface of an air-permeable material 131, and the softened tip of the wall surface material 111 is deformed into an inverted T-shape, thereby forming an adhesive joint. By contrast, according to a conventional technique, an adhesive is applied to a tip of a wall surface material of a honeycomb material. Then, without taking a temporal interval, the wall surface material is brought into contact with the air-permeable material to form an adhesive joint therebetween. Thus, as shown in FIG. 2(b), a wall surface material 112 is to be butt-joined to the air-permeable material to form an adhesive joint therebetween before the tip of the wall surface material 112 of the honeycomb material is softened. This does not cause deformation of the tip.

As understood from FIG. 2(a), the width of the tip of the wall surface material 111 of the water absorption honeycomb material is largely changed from a thickness t1 as a thickness of a raw material to t2 approximately three times the thickness t1, showing that an adhesive joint area is increased by a corresponding degree. By contrast, as understood from FIG. 2(b), according to the conventional technique, adhesive strength is ensured not by deforming the tip but by increasing the quantity of the adhesive to a comparatively large value instead and increasing an application height and an application width of the adhesive at a fillet p3.

Advantageous Effects of Invention

The extent of an adhesive joint surface to affect the strength of an adhesive joint between a honeycomb material and an air-permeable material is determined by the thickness of a wall surface material of a cell, unless the wall surface material of the cell is subjected to particular treatment. A method known as a conventional technique is to press the honeycomb material with a roller, for example, for deforming a tip of the wall surface of the cell forming the honeycomb material and increasing an adhesive joint surface. This method causes the problem that equipment or effort is required for pressing a constituting raw material of the honeycomb material.

Additionally, even a skilled operator still fails to press a tip of the wall surface material of the cell entirely uniformly with a roller. Hence, in some cases, a uniform honeycomb height cannot provided to make this work troublesome. Further, as the tip is pressed and deformed forcibly, pulp (fiber) forming the tissue of a raw material to form the honeycomb material is broken, causing the risk of strength reduction.

The present inventors have attained solution to the foregoing problems by combining a water absorption honeycomb material and a water-soluble adhesive, and dipping a tip of the water absorption honeycomb material in the water-soluble adhesive for a fixed period of time. This manufacturing method allows deformation of a tip of a wall surface material into an inverted T-shape while avoiding tearing off and break of pulp (fiber) forming the structure of a raw material for the honeycomb material. Thus, an adhesive joint area is increased significantly and a firm adhesive joint can be formed while the pulp (fiber) of tissue is maintained connected.

Adhesive strength of equal to or more than material breaking strength of the honeycomb material can be attained with a minimum quantity of application of an adhesive. As a result, it becomes possible to largely increase the strength of a sound absorption/insulation honeycomb panel as a whole. Further, as there is no need to press the honeycomb material with a roller, for example, effect is achieved in terms of eliminating the need for corresponding equipment and shortening manufacturing steps.

Setting the quantity of application of an adhesive at a minimum has solved the secondary problems raised in the technical problem such as reduction in a sound absorption area due to loss of a hole or a gap between fibers of an air-permeable material, reduction in a commercial value due to dirt on a surface of the air-permeable material caused by the adhesive having flowed, etc.

BRIEF DESCRIPTION OF DRAWINGS

FIG. 1 is a conceptual view of an adhesive applied to a tip of a wall surface material of a honeycomb material.

FIG. 2 is a conceptual view showing a situation where the honeycomb material and an air-permeable material are adhesively joined.

FIG. 11 is a cross-sectional view of a sound absorption/insulation honeycomb panel.

EMBODIMENTS FOR CARRYING OUT INVENTION

Example

Figure 3A:
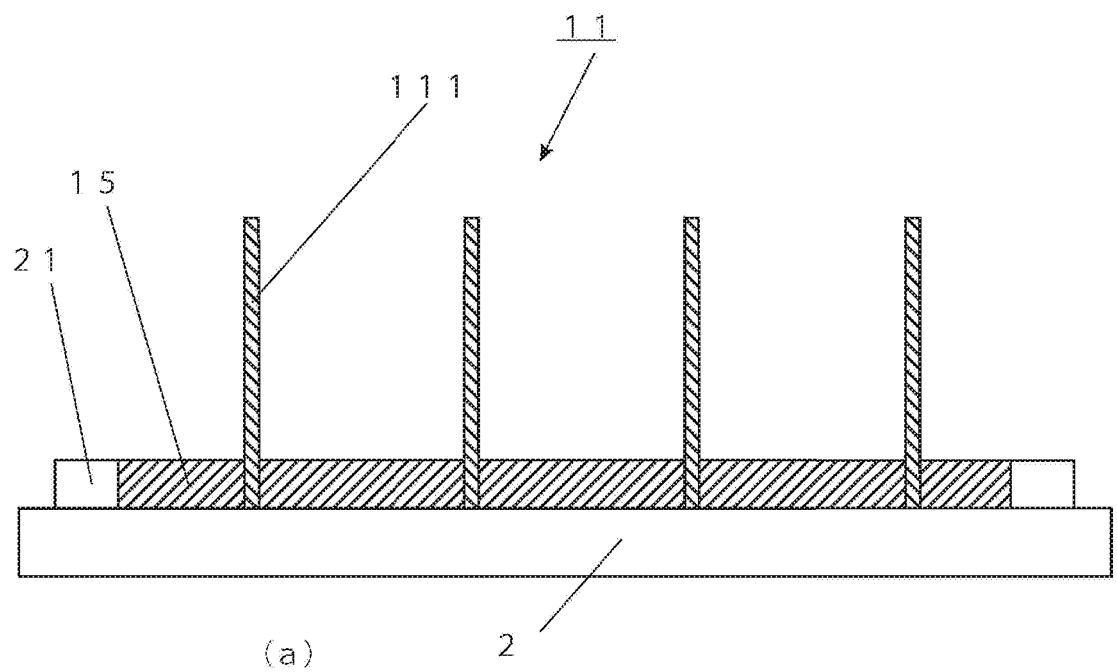
FIG. 3 is a conceptual view showing a step of applying the adhesive to the tip of the wall surface material of the honeycomb material.

An embodiment for carrying out the present invention will describe in detail below by referring to the drawings. FIG. 11 is a cross-sectional view of a sound absorption/insulation honeycomb panel 1 according to this example. The sound absorption/insulation honeycomb panel 1 has a structure formed by stacking three materials including a sound absorption layer in which cell space in a honeycomb material 11 is filled with a foam material 12, an air-permeable material 13 forming a sound absorption surface and a reflector 14 forming a sound insulation surface, and adhesively joining the corresponding materials.

An adhesive joint between the reflector 14 and the honeycomb material 11 filled with the foam material 12 is formed using not only the thickness of a raw material (a wall surface material of a cell) forming the honeycomb material 11 but also a surface of the filling foam material 12 facing the reflector 14. This eliminates the need to deform a tip of the wall surface material of the cell forming the honeycomb material 11 adjacent to the reflector 14 (upper tip in FIG. 11) into a T-shape.

Sound from outside enters the sound absorption/insulation honeycomb panel 1 through a surface in the presence of the air-permeable material 13 (in FIG. 11, through a lower side). In FIG. 11, wall surface materials of cells having the same shape and forming the honeycomb material 11 are illustrated repeatedly. To avoid complication of the drawing, only one of the wall surface materials is given a sign 11. FIG. 11 shows only a part of the entire structure extending to the right and left (this also applies to other similar drawings).

Figure 8A:
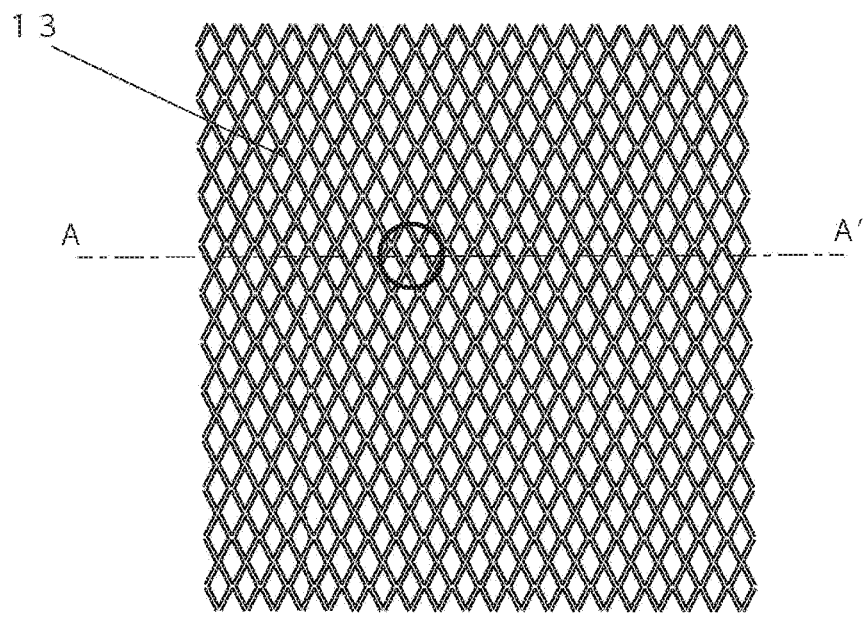
FIG. 8 is a view of the air-permeable material.
Figure 8B:
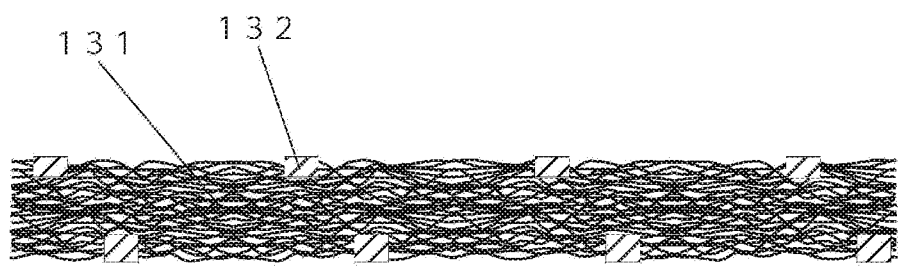

FIG. 8 is a view of the air-permeable material. FIG. 8 shows a part cutout from the air-permeable material. FIG. 8(b) is a cross-sectional view taken at a position indicated by A-A' in FIG. 8(a). The air-permeable material 13 is formed by sandwiching a sheet-like nonwoven fabric 131 made of aluminum alloy fiber from both sides between expanded metal 132 made of aluminum alloy (Poal $C_1$ available from UNIX Co., Ltd.). An entire thickness is 1.6 mm, the thickness of the expanded metal is 0.4 or 0.6 mm, and an opening ratio is 40%.

In this example, the nonwoven fabric made of aluminum alloy fiber is used as the air-permeable material forming the sound absorption layer. However, this nonwoven fabric may be replaced with a sheet made of a different metallic, or inorganic/organic fiber material.

Figure 9:
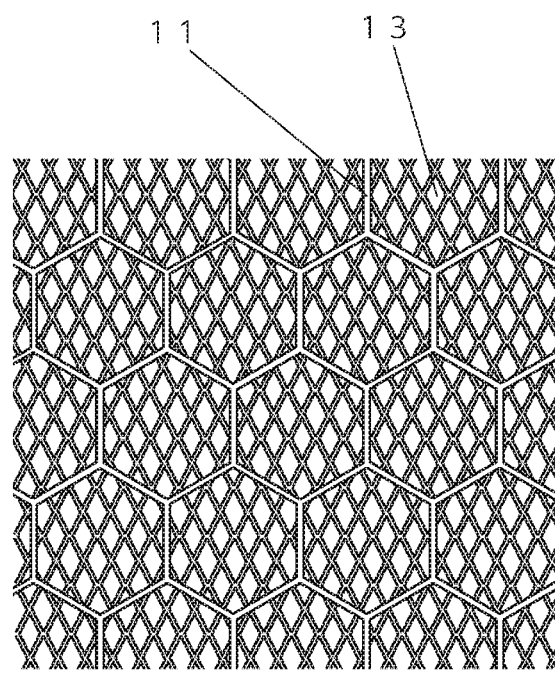
FIG. 9 is a plan view showing the honeycomb material and the air-permeable material in a state of being stacked on each other.

FIG. 9 is a plan view showing the honeycomb material without being filled with the foam material and the air-permeable material in a state of being stacked on each other. FIG. 9 shows a part cutout from the entire structure and viewed from above from the direction of the honeycomb material of FIG. 11.

Figure 7A:
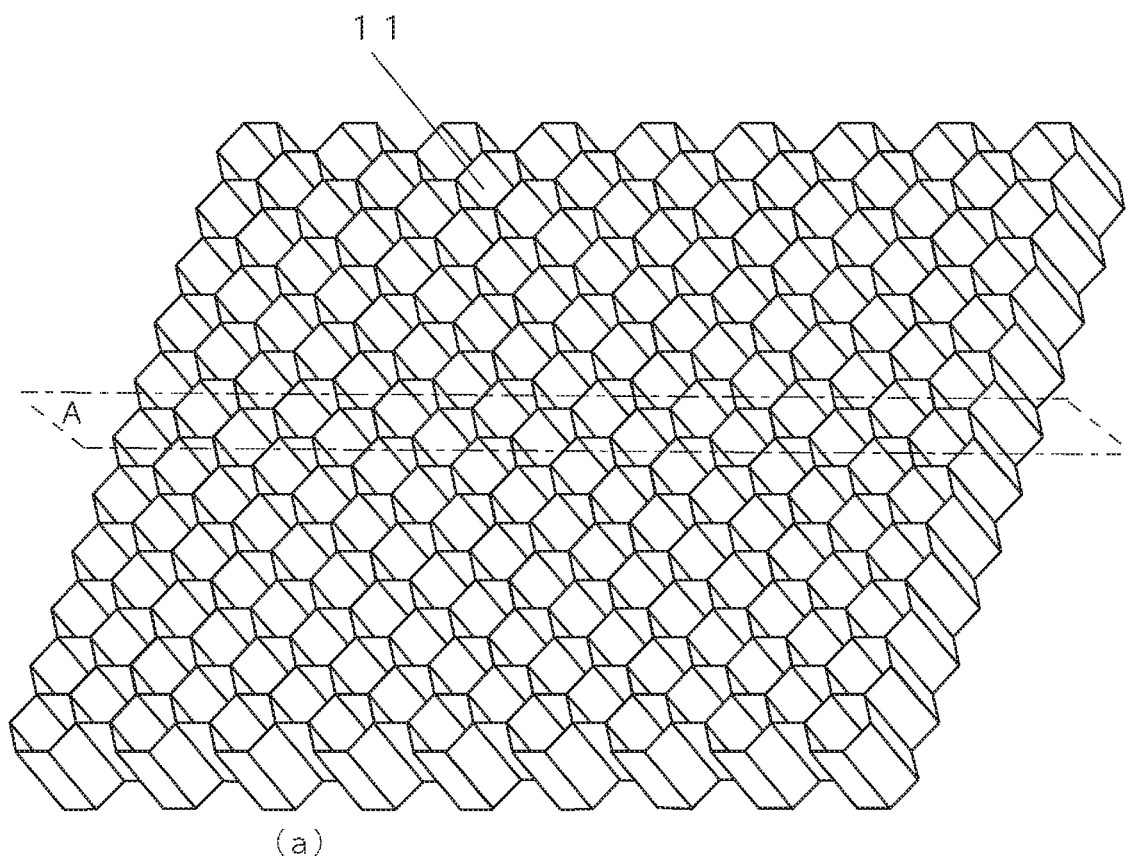
FIG. 7 is a view of the honeycomb material.
Figure 7B:
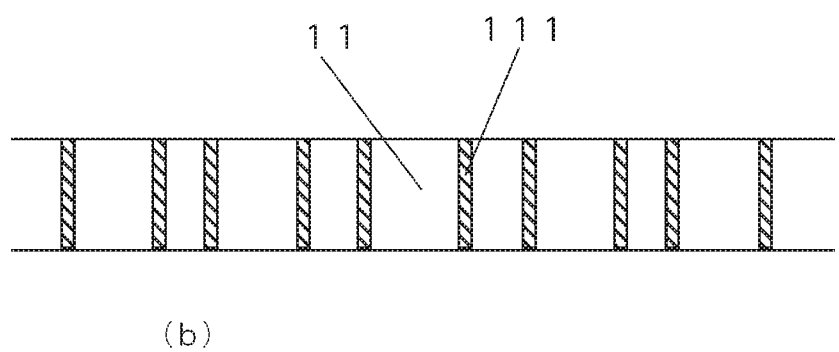

FIG. 7 shows a view of the honeycomb material. FIG. 7 shows a part cutout from the honeycomb material 11. FIG. 7(a) is a perspective view of the honeycomb material. FIG. 7(b) is a cross-sectional view taken at a position indicated by alternate long and short dashed lines A in FIG. 7(a). In this example, a water absorption honeycomb material (ceramic honeycomb HR20 available from TIGEREX) was used as the honeycomb material 11. The water absorption honeycomb material is made of a component such as hydrated magnesium silicate, pulp, silica, or adhesives, for example.

The honeycomb material may contain aluminum hydroxide as a component instead of hydrated magnesium silicate.

The honeycomb material used in this example is prepared by mixing fine powder of magnesium silicate or aluminum hydroxide as an auxiliary material for fulfilling a function such as incombustibility with pulp as a primary material, and fixing a resultant entire structure with a binder. This structure is a porous structure in the presence of gaps in the fine powder and gaps in the pulp (fiber) to provide hydrophilic properties to the honeycomb material. When the honeycomb material absorbs water, the honeycomb material is released from mechanical entanglement and released from chemical bond. As a result, the honeycomb material expands and becomes flexible.

The honeycomb material may be made of paper consisting of pulp alone without containing magnesium silicate or aluminum hydroxide. In this case, the honeycomb material is flammable and thus available for limited purpose. However, this honeycomb material still achieves the effect of softening and deforming a tip of a wall surface material with moisture, thereby increasing an area of contact with the air-permeable material.

In the honeycomb material 11 used in this example, the size of a hexagonal cell is 20 mm and the thickness of a wall surface material of the cell is 0.3 mm. The thickness of the honeycomb material 11 is set at 31 mm by giving consideration to a reduction to be caused by the deformation.

The foam material 12 to fill the honeycomb material is a rigid phenolic foam material. Phenolic form is manufactured by forming phenolic resin. A product used in this example has an open-cell content of 95% or more and has a density of 19 kg/m$^3$ (available from Matsumura Aqua Co., Ltd.). An open-cell structure with continuous air bubbles provides water absorbing properties. While the thickness of the honeycomb material 11 is 31 mm, the thickness of the foam material 12 is from 29 to 30 mm. The rigid phenolic foam material may be replaced with a rigid urethane foam material.

The reflector 14 is a layer installed behind the sound absorption layer and to be used for sound insulation. The reflector 14 is a thin plate made of aluminum without air permeability. The reflector 14 used in this example has a thickness of 1.2 mm.

In the sound absorption/insulation honeycomb panel having the stacked structure, an adhesive for forming an adhesive joint between the air-permeable material 13 and the honeycomb material 11 is a water-soluble emulsion-based adhesive (bond CX-50 containing a non-volatile component from 43.5 to 46.5% available from Konishi Co., Ltd.). As already described above, moisture in the adhesive can be used for making the tip of the wall surface material of the water absorption honeycomb material 11 flexible.

A water-soluble adhesive has a pH value generally in an acid region from 3.5 to 7.0 and causes metallic corrosion in the presence of moisture. The bond CX50 has a pH value from 3.5 to 5.0, so that a countermeasure against corrosion is required to be taken. In response to this, a material having high purity is used as a material for the nonwoven fabric made of aluminum alloy fiber.

In FIG. 11, an epoxy-based adhesive is used as an adhesive 16 for adhesively joining a surface defined by an integration of a surface of the foam material 12 and a tip of the wall surface material 111 of the honeycomb material 11 to the reflector 14.

A procedure of manufacturing the sound absorption/insulation honeycomb panel will be described next. The present inventors achieved strong adhesive strength to such an extent as to exceed the breaking strength of the honeycomb material itself by increasing an area of an adhesive joint between the honeycomb material and the air-permeable material.

This method employs means of dipping the tip of the wall surface material of the cell forming the water absorption honeycomb material into a pool of an emulsion-based adhesive to apply the adhesive to the tip, making the honeycomb material flexible at a part coated with the adhesive over a fixed period of time, and then applying strong pressure to deform a cross section at the part given the flexibility into an inverted T-shape, thereby increasing an adhesive joint area.

FIG. 3 is a conceptual view showing a manufacturing step of dipping the tip of the wall surface of the honeycomb material into the adhesive and applying the adhesive to the tip. FIG. 3 shows a part of the entire structure extending to the right and left. As shown in FIG. 3(a), a depth setting plate 21 having a shape with a closed periphery not shown is placed on a surface plate 2 arranged horizontally. A pool is formed by the surface plate 2 and the setting plate 21, and the emulsion-based adhesive 15 is poured into the pool to the height of the upper surface of the setting plate 21.

As shown in FIG. 3(a), the tips of the wall surface materials 111 of cells forming the water absorption honeycomb material 11 are dipped into the pool of the adhesive 15 so as to reach the bottom of the pool. As the surface plate 2 is arranged horizontally, all the wall surface materials 111 are dipped to the same depth. The wall surface materials 111 are kept dipped for a fixed period of time. In this example, the tips of the wall surface materials 111 of the cells forming the honeycomb material 11 start to become flexible after approximately 90 seconds, and become sufficiently flexible after approximately 120 seconds. Thus, these tips are ready to be deformed by being pressed strongly against the air-permeable material.

Figure 3B:
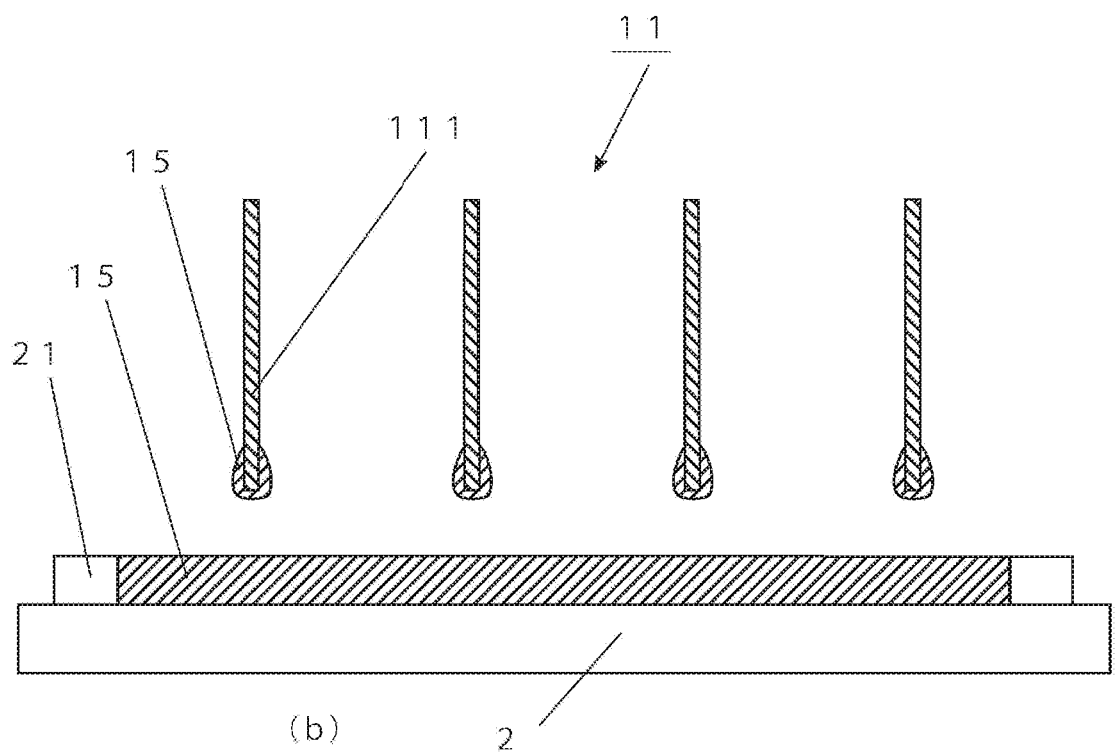

As shown in FIG. 3(b), the water absorption honeycomb material 11 is pulled out of the pool of the adhesive 15. Then, the tips of all the wall surface materials 111 of the cells forming the water absorption honeycomb material are coated with the adhesive 15 having heights same as the depth of the pool of the adhesive 15. Parts of the honeycomb material coated with the adhesive are softened. In this example, a depth of the dipping, namely, an adhesive application height is 1 mm. A quantity of the application is from 80 to 100 g/m$^2$.

In this step, part of water in the adhesive 15 permeates with time into the wall surface material 111 of the water absorption honeycomb material 11. The permeation of the moisture is concentrated at a part coated with the adhesive 15, so that only the concentrated part becomes flexible.

The adhesive itself permeates into the part of the honeycomb material 11 given the flexibility. Thus, when the adhesive is cured thereafter, the adhesive forms a firm composite structure together with tissue constituting the honeycomb material.

Figure 4A:
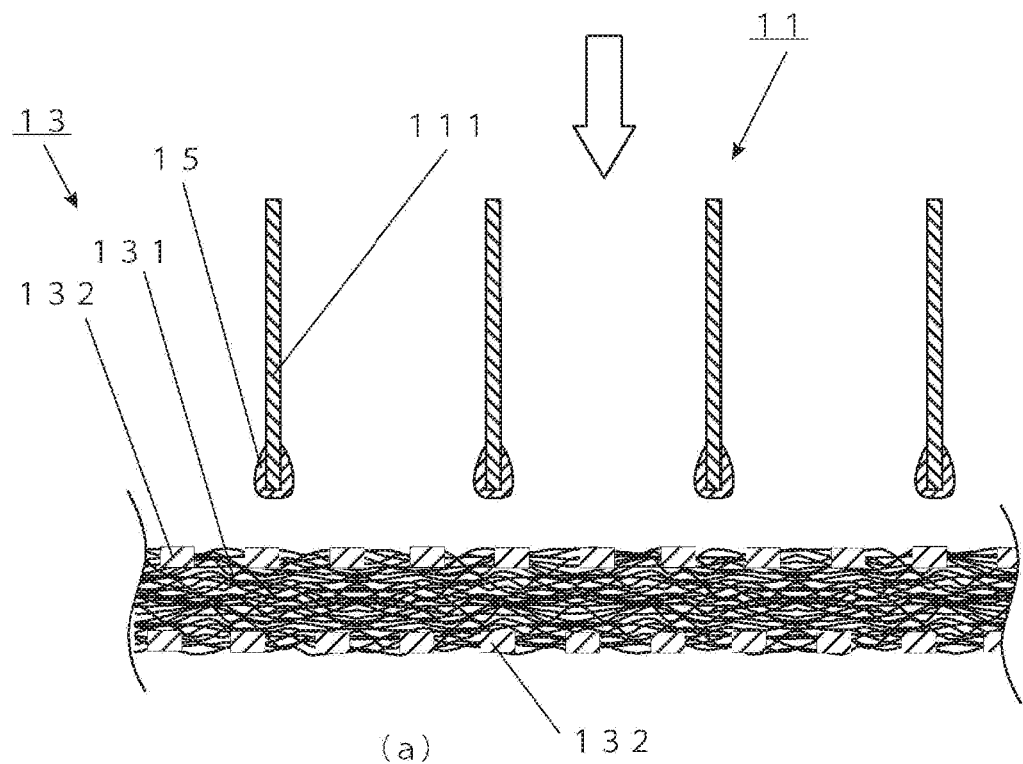
FIG. 4 is a conceptual view showing a step of adhesively joining the honeycomb material and the air-permeable material.

Next, FIG. 4 is a conceptual view showing a step of adhesively joining the honeycomb material and the air-permeable material. As shown in FIG. 4(a), the wall surface materials 111 of the cells forming the honeycomb material 11 are placed so as to face the air-permeable material 13 arranged horizontally from above. By using a press not shown, the wall surface materials 111 are moved down as shown by an arrow in the drawing to press the wall surface materials 111 against the air-permeable material 13 under a pressure of 5 ton/m$^2$.

Figure 4B:
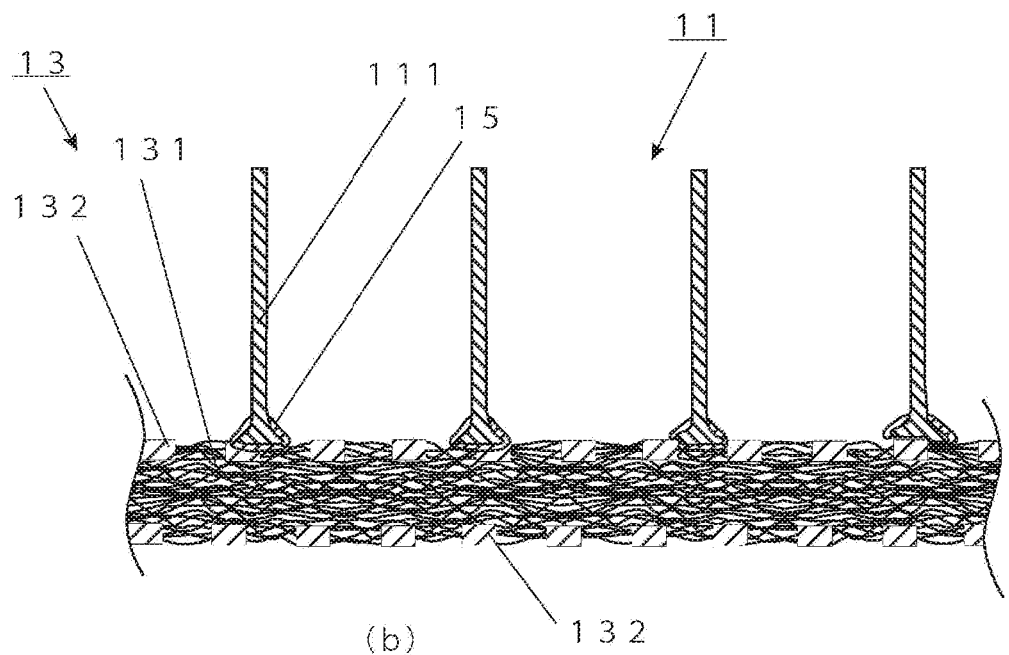

As shown in FIG. 4(b), the tips of the wall surface materials 111 of the cells forming the water absorption honeycomb material 11 strongly pressed against the air-permeable material 13 are deformed into inverted T-shapes in cross sections. Part of the adhesive applied to the tips of the wall surface materials 111 flows from the bottoms of the inverted T-shapes to permeate into the air-permeable material 13. Different part of the adhesive forms fillets, as descried by referring to FIG. 2(a).

As a result of the deformation into the inverted T-shape, the thickness of the wall surface material 111, which is originally 0.3 mm, is changed to 0.9 mm determined as the width of the crossbar of the T shape. Namely, an adhesive joint area is tripled.

This state is kept until the adhesive is cured. Part of the adhesive 15 having permeated into the tip of the wall surface material 111 forms a composite structure together with hydrated magnesium silicate and pulp (fiber) as components of the water absorption honeycomb material 11 to be cured. Likewise, part of the adhesive 15 having permeated into the air-permeable material 13 forms a composite structure together with a fiber material as one of elements constituting the air-permeable material to be cured.

Figure 10A:
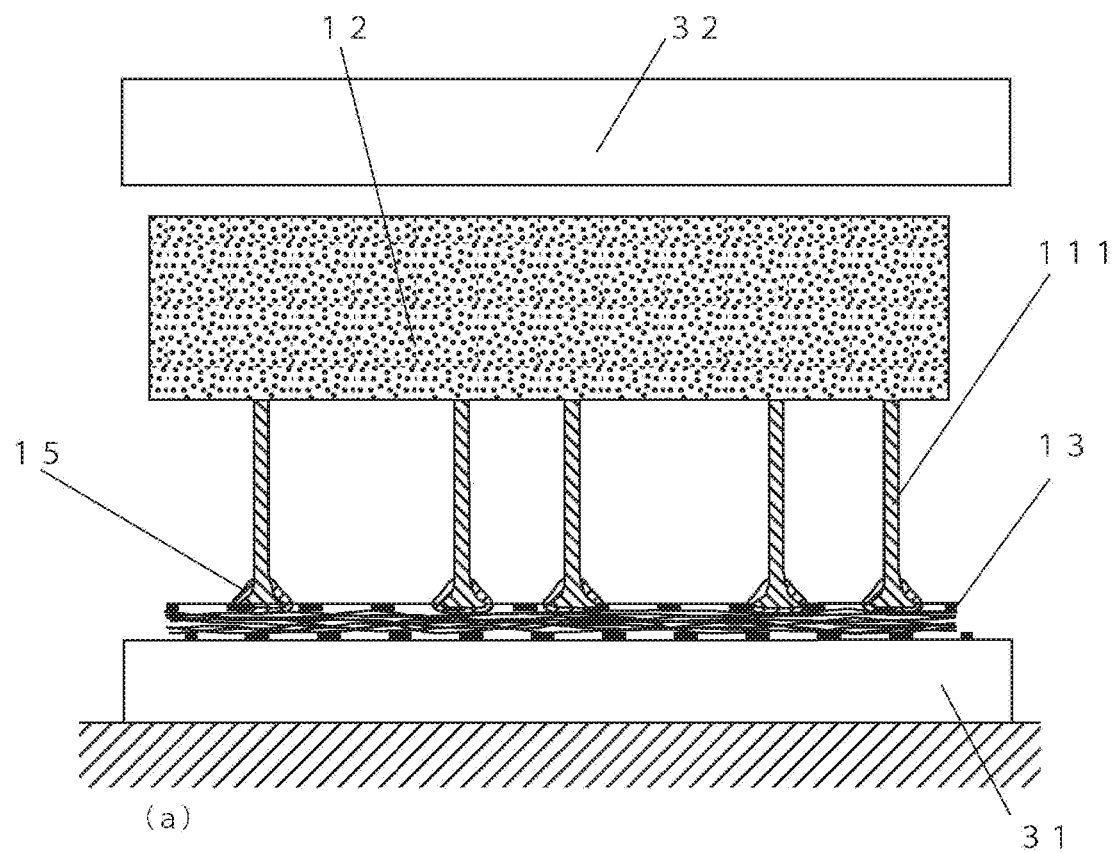
FIG. 10 is a conceptual view showing a step of filling the honeycomb material with a foam material.

Next, FIG. 10 is a conceptual view showing a step of filling the honeycomb material with the foam material. As shown in FIG. 10(a), a structure including the wall surface materials 111 of the cells forming the honeycomb material 11 and the air-permeable material 13 adhesively joined to each other is placed on a lower press platen 31, and the foam material 12 is stacked on this structure. An upper press platen 32 is moved down from above the foam material 12.

Figure 10B:
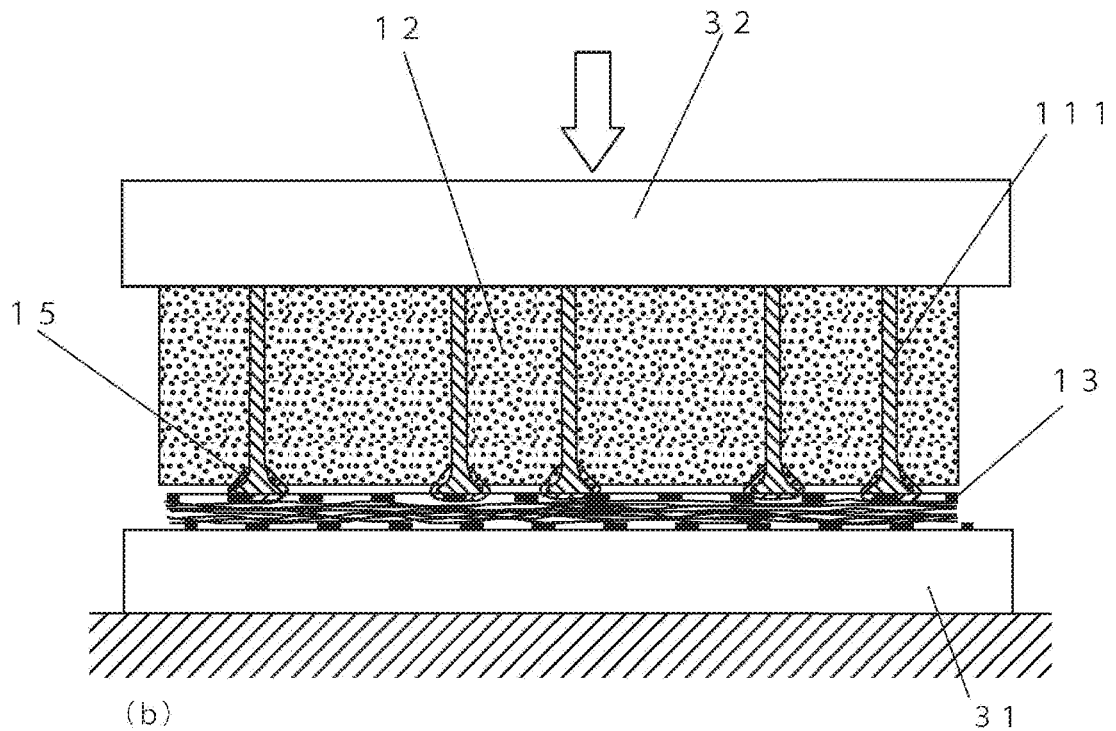

As shown in FIG. 10(b), as the upper press platen 32 is moved down, the wall surface materials 111 of the cells forming the honeycomb material penetrate into the foam material 12 to make the upper surface of the foam material 12 reach the positions of the upper ends of the wall surface materials 111 of the honeycomb material. Then, the upper press platen 32 stops moving down. At this time, the lower surface of the form material 12 may be at a position not reaching the air-permeable material 13 to form a void therebetween.

In the foregoing description, the step of deforming the tip of the wall surface material by pressing the honeycomb material strongly and the step of filling the honeycomb material with the foam material are performed separately. Alternately, these two steps may be performed simultaneously. In this case, by filling the honeycomb material with the water absorption form material to a part coated with the adhesive, moisture in the water-soluble emulsion-based adhesive applied to the honeycomb material is absorbed by the honeycomb material, thereby achieving the effect of facilitating curing of the adhesive.

Next, as shown in FIG. 11, the epoxy-based adhesive 16 is applied to the entire surface of the reflector 14, and the reflector 14 is adhesively stacked on a surface formed by the upper end of the honeycomb material 11 and the upper surface of the foam material 12. In this way, formation of the sound absorption/insulation honeycomb panel 1 is completed.

The effect of the method of manufacturing the sound absorption/insulation honeycomb panel 1 having the foregoing structure will be described again in more detail. The fundamental effect already described above is that, an adhesive joint area is increased by deforming the tip of the wall surface material of the honeycomb material, thereby obtaining large adhesive force with a small quantity of an adhesive.

Figure 5A:
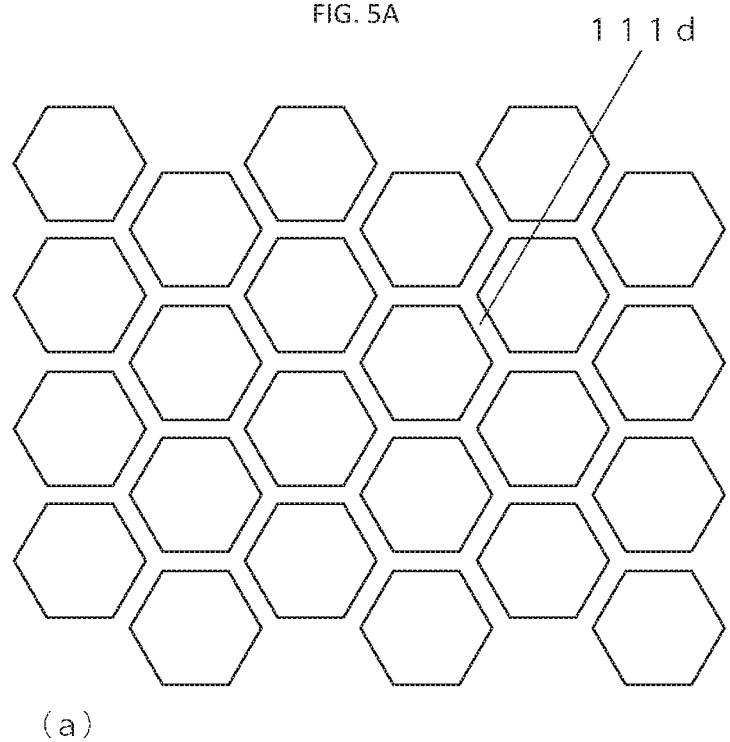
FIG. 5 is a plan view showing the thickness of a wall surface material of a cell forming the honeycomb material.
Figure 5B:
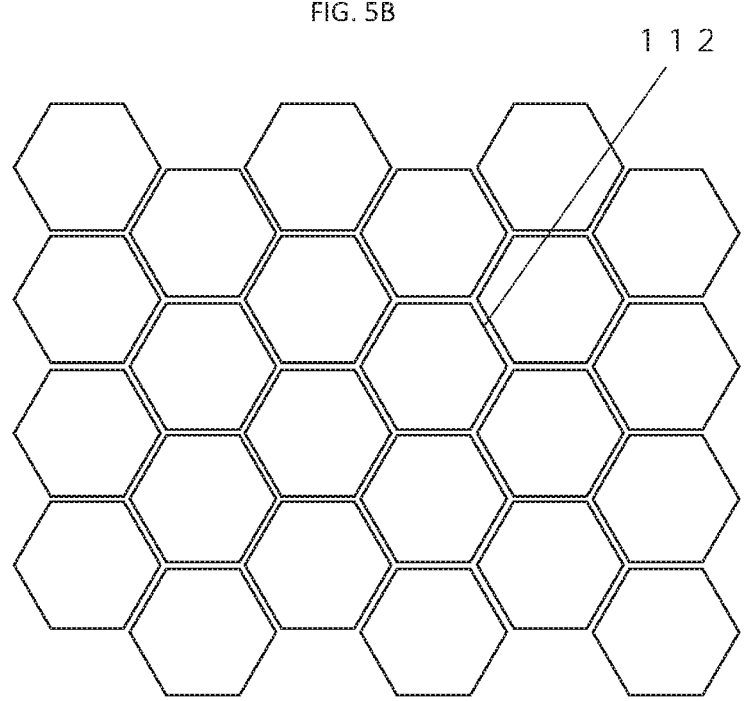

FIG. 5 is a plan view showing the thickness of the wall surface material of the cell forming the honeycomb material. The wall surface material of the cell is vertical to the plane of the sheet of the drawing. FIG. 5 shows only the wall surface material of the cell without an applied adhesive. FIG. 5(a) shows a case where the tip of the wall surface material of the cell is pressed to be deformed into an inverted T-shape by the method according to the present invention. In FIG. 5(a), a distance between hexagons means the width of a tip 111d of the wall surface material increased by the deformation, which corresponds to t2 shown in FIG. 2(a). FIG. 5(b) shows a case using a method according to the conventional technique not involving deformation of a tip. In FIG. 5(b), a distance between hexagons means the thickness of the wall surface material 111 before the deformation, which corresponds to t1 shown in FIG. 2(b).

In comparison to FIG. 5(b), it can be understood from FIG. 5(a) that the thickness of the wall surface material is increased by the deformation into the inverted T-shape, namely, an adhesive joint area is increased. This certainly results in corresponding increase in adhesive strength.

The tensile strength of the water-soluble emulsion-based adhesive used in this example, determined by curing this adhesive alone to shape the resin into a resin form, is 167 kgf/cm$^2$. Further, tensile strength to cause break of the water absorption honeycomb material alone is 2.6 kgf/cm$^2$.

More specifically, in the adhesive joint surface enlarging step of the present invention performed by pressure application after the wall surface material becomes flexible, pulp (fiber) in the honeycomb material has already been made flexible and thus is not to be cut and broken. This pulp (fiber) and the adhesive having permeated are cured to form a composite structure of resin. Thus, the strength of this composite structure is considered to take an intermediate value between the strength of the honeycomb material alone and the strength of the cured adhesive alone (a value between 2.6 and 167 kgf/cm$^2$) Namely, this achieves the effect that, once the tip of the wall surface material of the honeycomb material is softened and deformed, the deformed tip contains the adhesive to change its properties, and the cured tip attains strength exceeding the strength of the honeycomb material in the original state.

After the water-soluble emulsion-based adhesive is cured, this adhesive exhibits a vitrified resin state. This phenomenon occurs after passage of a certain period of time still after the curing. The vitrified resin after the curing becomes water-resistant resin not to be softened even by being dipped in water. An aging test conducted separately shows that after cured resin is dipped in water, this resin does not dissolve even under the influence of water, and a composite resin state having strength fit for practical use for 16 years is confirmed to be maintained.

Figure 6A:
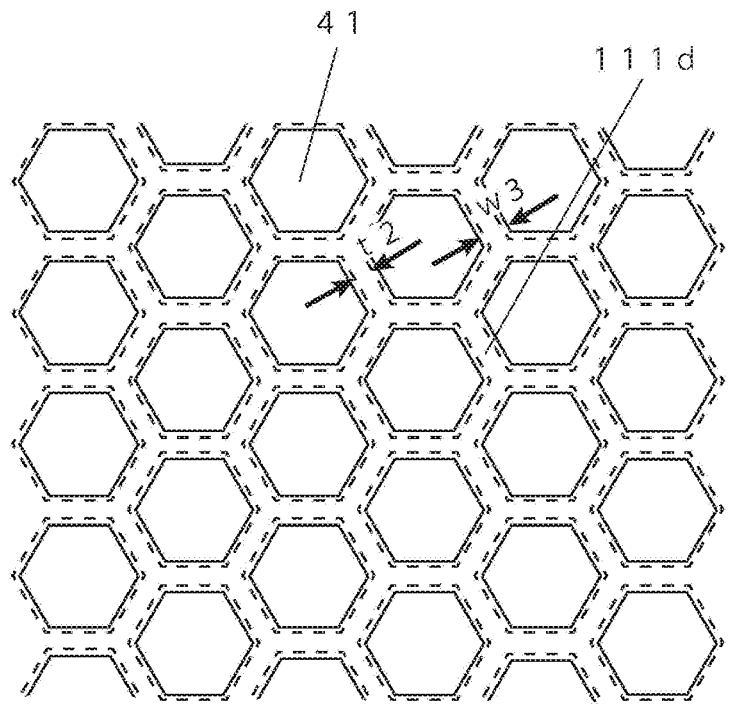
FIG. 6 is a plan view showing spreading of the adhesive determined by adhesively joining the honeycomb material.
Figure 6B:
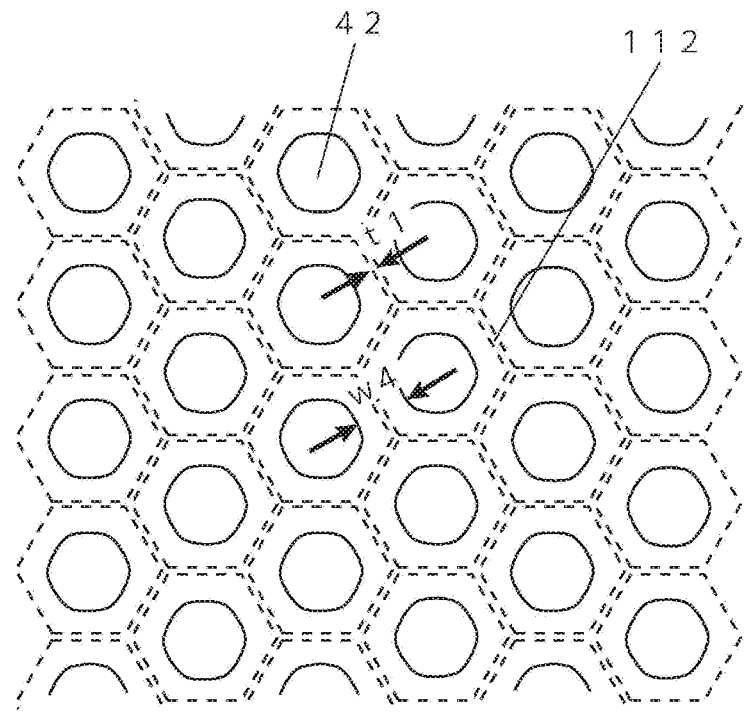

FIG. 6 is a plan view of a surface of the air-permeable material viewed from above from the direction of the honeycomb material when the air-permeable material and the honeycomb material are adhesively joined, showing spreading of the adhesive in a hexagonal reticular pattern over the surface of the air-permeable material. FIG. 6(a) corresponds to FIG. 2(a). FIG. 6(b) corresponds to FIG. 2(b). In each of these drawings, tips of the wall surface materials of the honeycomb material are indicated by dashed lines. Solid lines show the contours of the applied adhesive having flowed into the peripheries of the wall surface materials.

FIG. 6(a) shows the state of an applied adhesive determined after the thickness of the tip 111d of the wall surface material 111 of the water absorption honeycomb material is increased from the original thickness of t1 to the thickness t2 by dipping the tip 111d into the adhesive to make the tip 111d flexible, and then pressing the tip 111d to deform the tip 11d into an inverted T-shape. FIG. 6(b) shows a state in which a tip of the wall surface material 112 of the water absorption honeycomb material is not softened and thus the thickness of the wall surface material 112 is not changed to maintain the thickness t1 of a raw material as the tip of the wall surface material 112 is pressed and adhesively joined immediately after being coated with the adhesive.

FIG. 6 shows a state in which the adhesive having been applied to the wall surface material of the honeycomb material is shifted to the surface of the air-permeable material to block an opening in the air-permeable material. In FIG. 6, an opening is defined inside solid lines indicating a hexagonal shape or a hexagonal shape with rounded corners, and an interval between the hexagons is a non-opening blocked with the adhesive. FIGS. 6(a) and 6(b) correspond to FIGS. 2(a) and 2(b) taken from the directions of the honeycomb materials 111 and 112 respectively.

The dimension of an opening 41 indicated by solid lines in FIG. 6(a) and that of an opening 42 also indicated by solid lines in FIG. 6(b) are compared as follows. In the case of the water absorption honeycomb material shown in FIG. 6(a), the adhesive spreads only to w3 slightly greater than the thickness t2 of the honeycomb material.

By contrast, in the case of the water absorption honeycomb material shown in FIG. 6(b), as a large quantity of the adhesive is applied to the tip of the wall surface material of the honeycomb material, the adhesive having been applied to the honeycomb material for adhesively joining the honeycomb material and the air-permeable material is shifted to the surface of the air-permeable material, and further flows a distance of 2 to 4 mm in the horizontal direction over the surface of the air-permeable material to be increased in width to w4 considerably greater than the thickness t1 of the honeycomb material.

Hence, the opening is blocked seriously in the case of FIG. 6(b), so that the opening 42 is considerably smaller than the opening 41. To facilitate understanding, these drawings are illustrated in an exaggerated fashion.

Filling the honeycomb material to which the adhesive is applied with the foam material loses a place for escape of a part of the adhesive applied to the tip of the wall surface material of the honeycomb material not to permeate into the honeycomb material. This part of the adhesive spreads over a surface of the fiber material around the honeycomb material and forming the air-permeable material while being pressed and spread by the foam material. Namely, the adhesive is spread out with the foam material over the surface of the air-permeable material to increase an area of spreading of the adhesive further. As described above, spreading of the adhesive blocks the opening to cause reduction in an opening ratio.

According to the method of the present invention shown in FIG. 2(a), the tip of the wall surface material is softened, deformed, and adhesively joined over time using the water absorption honeycomb material. This allows reduction in the quantity of adhesive usage to result in a corresponding reduction in the quantity of the adhesive to flow over the surface of the air-permeable material, thereby achieving the effect of providing a large opening ratio.

By contrast, according to the method of the conventional technique shown in FIG. 2(b), while the water absorption honeycomb material is still used, an adhesive joint is formed without spending time in softening the tip of the wall surface material. This necessitates increase in the quantity of adhesive usage for obtaining required adhesive strength. Hence, a larger quantity is to flow toward the surface of the air-permeable material, reducing an opening ratio conversely.

Referring to the level of an opening ratio, as an opening ratio becomes greater, a greater amount of sound from outside is absorbed by the foam material. This leads to the effect of improving characteristics in terms of a sound absorption coefficient.

Figure 12:
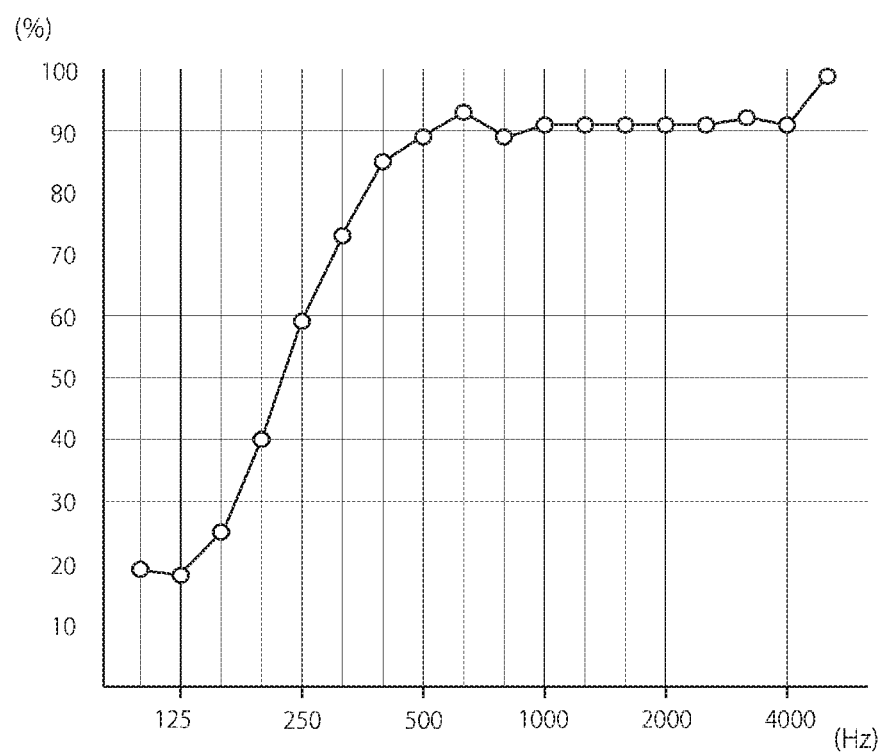
FIG. 12 is a graph of a reverberation room method sound absorption coefficient.

FIG. 12 shows a graph of a reverberation room method sound absorption coefficient. A vertical axis shows the reverberation room method sound absorption coefficient, and a horizontal axis shows a ⅓ octave-band center frequency (unit: Hz). This graph shows data about the sound absorption coefficient of the sound absorption/insulation honeycomb panel according to the present invention having a weight of 8 kg/m$^2$ and a thickness of 33 mm, and obtained by the method of measuring a reverberation room method sound absorption coefficient (JIS A 1409). A high sound absorption coefficient fit for practical use was confirmed in a range of 400 Hz to 4 kHz.

As described above, even with reduction in the quantity of an adhesive, adhesive force can still be increased by using the water absorption honeycomb material, applying the water-soluble adhesive to the tip of the wall surface material of the honeycomb material to make the tip flexible, and pressing the honeycomb material strongly against the air-permeable material as a counterpart of an adhesive joint to deform the tip into an inverted T-shape, thereby forming the adhesive joint with an increased adhesive joint area. This makes it possible to realize a method of manufacturing the sound absorption/insulation honeycomb panel functioning as a panel having high strength.

In the foregoing description, the tip of the wall surface material of the cell forming the water absorption honeycomb material is dipped into the water-soluble adhesive for a fixed period of time to make the tip flexible. Then, the honeycomb material is pulled out and pressed strongly against the air-permeable material as a counterpart of an adhesive joint to change the cross-sectional shape of the tip of the wall surface material of the cell into an inverted T-shape, thereby increasing an adhesive joint area. As an alternative procedure, after the tip of the wall surface material of the cell is dipped into the water-soluble adhesive, the honeycomb material may be pulled out appropriately and left in a state of being coated with the adhesive until the tip becomes flexible. Then, the honeycomb material may be pressed strongly against the air-permeable material.

REFERENCE SINGS LIST

1 Sound absorption/insulation honeycomb panel
11 Honeycomb material
111 Wall surface material (of cell)
111d Deformed part
112 Wall surface material (of cell)
12 Form material
13 Air-permeable material
131 Nonwoven fabric made of aluminum alloy fiber
132 Expanded metal made of aluminum alloy
14 Reflector
15 Adhesive
16 Adhesive
2 Surface plate
21 Depth setting plate
31 Lower press platen
32 Upper press platen
41 Opening
42 Opening
h1 Adhesive application height
h2 Adhesive application height
w1 Adhesive width
w2 Adhesive width
w3 Adhesive width
w4 Adhesive width
p3 Adhesive fillet
p4 Adhesive fillet
t1 Thickness of raw material of honeycomb material
t2 Thickness of raw material deformed part of honeycomb material

The invention claimed is:

1. A method of manufacturing a sound absorption/insulation honeycomb panel by stacking a water absorption honeycomb material filled with at least a foam material and an air-permeable material, and forming an adhesive joint between the honeycomb material and the air-permeable material, wherein
the adhesive joint is formed with an adhesive joint area increased by dipping one tip of a wall surface of the water absorption honeycomb material into a water-soluble adhesive, making the tip absorb moisture in the water-soluble adhesive, and pressing the tip strongly against the air-permeable material so as to coincide with time when the tip is softened to deform the tip.

2. The method of manufacturing the sound absorption/insulation honeycomb panel according to claim 1, wherein the water-soluble adhesive is an emulsion-based adhesive.

3. The method of manufacturing the sound absorption/insulation honeycomb panel according to claim 1, wherein the water absorption honeycomb material is filled with a rigid water absorption foam material having an open-cell structure containing at least a rigid phenolic foam material or a rigid urethane foam material.

4. The method of manufacturing the sound absorption/insulation honeycomb panel according to claim 1, wherein the water absorption honeycomb material to be used contains either hydrated magnesium silicate or aluminum hydroxide, and pulp.

5. The method of manufacturing the sound absorption/insulation honeycomb panel according to claim 1, wherein a nonwoven fabric made of aluminum alloy fiber is used as the air-permeable material.

* * * * *